(12) United States Patent
Needham et al.

(10) Patent No.: US 6,188,767 B1
(45) Date of Patent: Feb. 13, 2001

(54) METHOD OF PROVIDING GROUP CALL SERVICES IN A CDMA COMMUNICATIONS SYSTEM

(75) Inventors: Michael L. Needham, Palatine, IL (US); Leigh M. Chinitz, Silver Spring, MD (US); Duane C. Rabe, Hawthorn Woods, IL (US)

(73) Assignee: Motorola, Inc., Schaumburg, IL (US)

( * ) Notice: Under 35 U.S.C. 154(b), the term of this patent shall be extended for 0 days.

(21) Appl. No.: 09/069,586

(22) Filed: Apr. 29, 1998

(51) Int. Cl.[7] ................................ H04L 9/32; H04Q 7/38
(52) U.S. Cl. ..................... 380/271; 455/31.1; 455/38.1
(58) Field of Search ................................ 380/270, 271, 380/279; 455/31.1, 32.1, 38.1

(56) References Cited

U.S. PATENT DOCUMENTS

| | | | |
|---|---|---|---|
| 5,715,236 | * 2/1998 | Gilhousen et al. | 370/209 |
| 5,727,064 | * 3/1998 | Reeds, III | 380/49 |
| 5,940,515 | * 8/1999 | Kasavaraju | 380/49 |
| 5,999,623 | * 12/1999 | Bowman et al. | 380/20 |

* cited by examiner

*Primary Examiner*—Tod Swann
*Assistant Examiner*—Justin T. Darrow
(74) *Attorney, Agent, or Firm*—James A. Coffing; Jeffrey K. Jacobs

(57) ABSTRACT

The present invention encompasses a base station and method of providing communication services to a plurality of communication units. The method includes the steps of sending communication information between the base station and at least two of the plurality of communication units. A first step of identifying communication units produces a group identifier. A scrambling code, based at least in part on the group identifier, is then used to encode the communication information for transmission.

13 Claims, 5 Drawing Sheets

*—PRIOR ART—*

*—PRIOR ART—*

500

METHOD OF PROVIDING GROUP CALL SERVICES IN A CDMA COMMUNICATIONS SYSTEM

FIELD OF THE INVENTION

The present invention relates generally to the field of wireless communications and, more particularly, to code division multiple access (CDMA) communication systems that provide group call communication services.

BACKGROUND OF THE INVENTION

A typical two-way radio communication system comprises communication units, communication resources, communication sites, and base station for each of the sites to allocate communication resources among the communication units. Each site has a substantially distinct coverage area and sites are geographically located throughout the system. Each site also has a number of communication resources assigned to it, where at least one of the communication resources is used as a control channel, while a number of the remaining communication resources are used as voice channels. Such systems are known to use both frequency division multiplex access (FDMA) and time division multiple access (TDMA) methods to rebroadcast transmissions.

In a system that supports group (sometimes referred to as dispatch) calls, the communication units are typically arranged into communication groups (talkgroups) and may be located anywhere within the system (in any site). When a communication unit of a talk group requests a group call, it transmits, via a control channel of the site in which it is located, an inbound signaling message to the base station in that site. (It is noted that a group call typically allows all members of the same talk group that are located within the system to communicate with each other.) The inbound signaling message generally comprises the requesting communication unit's individual identification number (i.e., subscriber ID), the requesting communication unit's talkgroup (i.e., talkgroup ID) and a request for a group call. Upon receiving the inbound signaling message, the base station allocates a voice channel to the requesting communication unit's talkgroup.

Thus, in FDMA and TDMA dispatch systems, an outbound link is established and monitored by all units involved in the group call. Of course, each of the communication units are able to receive the communication information on the outbound link because they share a common knowledge about the link such as frequency, timeslot, etc., and can configure themselves to accommodate reception of signals on that link.

FIG. 1 shows a graphical representation of a radio communication system 100 that includes a base station 102 and a plurality of mobile stations, or communication units 103–108, designated as MS1–MS6. These mobile stations communicate with the base station on communication links, e.g., inbound link 109 and/or outbound link 111.

In the last decade, in response to an ever-accelerating worldwide demand for mobile and personal portable communications, spread spectrum digital technology, including one type known as code division multiple access (CDMA), has proved to be an alternative for serving large populations of multiple access users over analog or other digital technologies. The outbound (or forward) link, i.e., between the base station and subscribers, is shared between all users of the systems by means of code division multiplexing. The use of code division multiplexing allows more channels to be derived by the overlaying of carriers one over another and greatly enhances performance in terms of derived channels per hertz of bandwidth. Additionally, security measures are typically applied to prevent inadvertent or unauthorized monitoring of a user's signal by another communication unit receiving the same shared modulation.

FIG. 2 shows a CDMA-based communication system 200 that includes a base station 201 and a plurality of mobile stations, or communication units 203–205. Analogous to the FDM/TDM systems, the mobile stations communicate with the base station via links 207–209, as shown. However, rather than a dedicated link between the base station and each MS, the CDMA system uses a common channel (e.g., frequency) for communications, relying on unique pseudo-random number sequences (PNi for communications directed to MSi) to allow the target MS to decode the transmitted information, as illustrated. It should be noted that, in a typical CDMA system, the inbound links are also shared in CDMA fashion with different PN sequences. The application of a long code, Walsh code, and short code (collectively, the PN) to the coded information-bearing bit stream is referred to herein as the process for spreading of the bit stream with a PN sequence.

CDMA is well suited for cellular communications, but has never been employed in a system supporting dispatch group calls. The difficulties in applying CDMA techniques to dispatch group communications include forward and reverse power control, the need to support soft hand-offs, and provision of security features. With regard to the latter problem, it is well known that today's CDMA systems are required to comply with the TIA/EIA/IS-95-A for 800 MHz operation (cellular) and ANSI J-STD-008 for 1.8 GHz operation (PCS), which include, inter alia, a scrambling code referred to as a long code. This long code is used to provide a layer of security for communication between a communication unit and the base station. As is known, this is accomplished by encoding a data stream with a high-order polynomial string (i.e., long code) that is known only by the targeted subscriber.

In today's CDMA systems, private calls are encoded using the long code, which is typically derived from the subscriber ID (i.e., electronic serial number, or ESN) therefore making the long code unique to each communication unit. Since the ESN is unique to each subscriber unit, the scrambling of the outbound data stream with a portion of this code means that only a target which knows the long code of the intended recipient can decode the transmitted message. In the case of group communications, however, this is no longer a useable approach. That is, in a group communication in which more than one member of the group is in the same cell, each of those members receive the same outbound transmission from the base. This transmission from the base can no longer be scrambled using a long code that is unique to a single subscriber unit, for, in that case, none of the other members of the group receiving that transmission would be able to unscramble it.

Thus, in the context of a group call, which involves more than one subscriber (and hence multiple subscriber IDs), it is not presently possible to provide the layer of security that the IS-95 compliant long code is designed to provide, while still providing an outbound link that may be monitored by all units involved in a group call.

Accordingly, there exists a need to provide group communication services to a plurality of communication units in a spread spectrum system, without foregoing the security features provided in private call services. Further, such a service that complied with IS-95 specifications for CDMA communications would be an improvement over the prior art.

BRIEF DESCRIPTIONS OF THE DRAWINGS

DETAILED DESCRIPTION OF A PREFERRED EMBODIMENT

The present invention encompasses a method for sending communication information between a base station and a plurality of communication units in a digital communication system. Generally, the method includes the step of identifying a group identifier for the plurality of communication units that are to receive a group call. This group identifier is then used to generate a scrambling code for use in encoding, at the base station, and decoding, at the plurality of communication units, the communication information that is transmitted. In this manner, a spread spectrum digital communication system is able to efficiently provide group call services and still maintain the privacy requirements of a standardized spread spectrum protocol.

Figure 1:
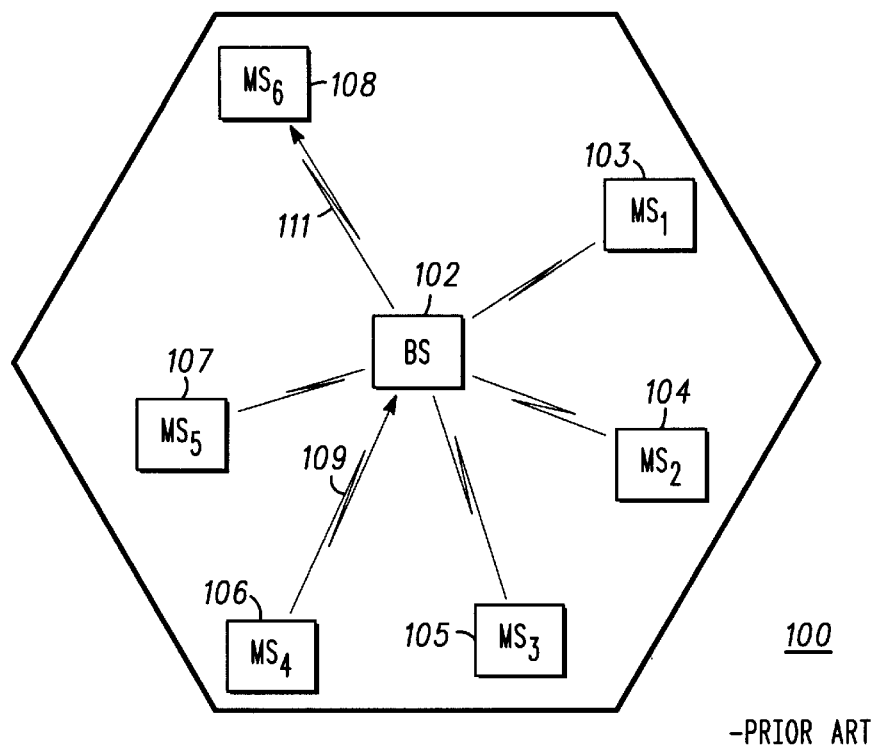
FIG. 1 shows a graphical representation of a two-way radio communication system, as is known in the art.
Figure 2:
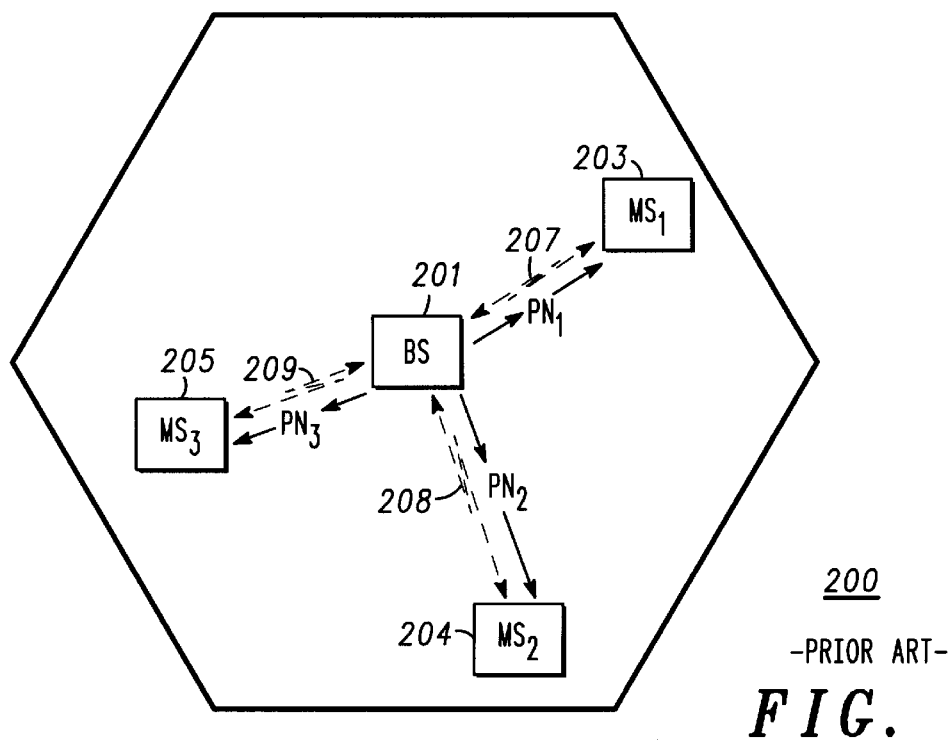
FIG. 2 shows a graphical representation of a CDMA radio communication system, as is known in the art.
Figure 3:
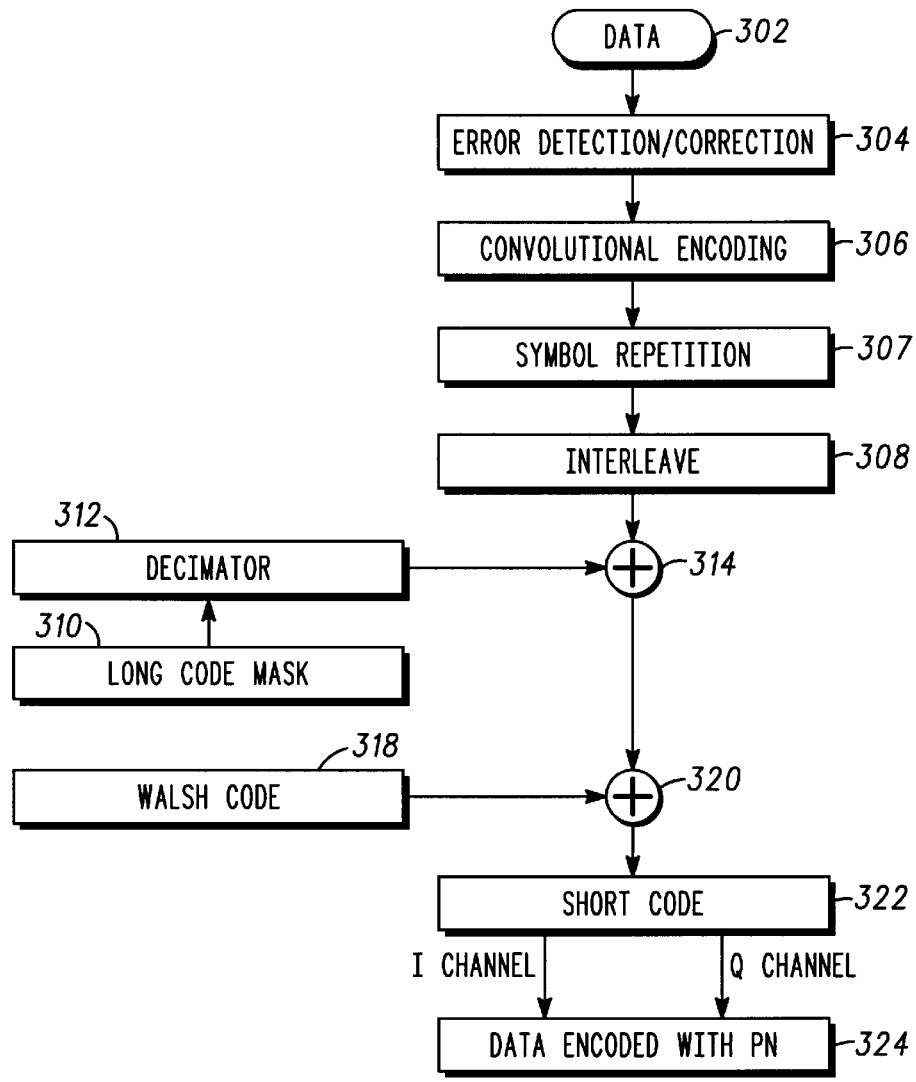
FIG. 3 shows a simplified circuit representation of a CDMA data and coding scheme, in accordance with the present invention.

FIG. 3 shows a graphical representation of an encoding scheme employed by a base station, in accordance with the present invention. One skilled in the art will recognize that FIG. 3 is a simplified version of FIG. 7.1.3.1-1 in TIA/EIA/IS-95-A. As is known, the information-bearing digital data 302 has additional bits added to it in order to create a bit stream of a desired length. These bits are added using the error detection and error correction block 304, convolutional encoding block 306 and symbol repetition block 307 (i.e., when the information bit rate used is less than the full bit rate). In order to protect the privacy of this coded information bit stream when it is transmitted over the air, the bit stream is then subjected to binary addition with a bit stream of the same length made up of selected bits from the long code mask 310. Decimator 312 selects one bit out of every 64 of the long code mask to be used in the summation 314. This summation 314 scrambles the coded information, as later described, and affords some level of privacy to the conversation between the base and subscriber unit.

Once the scrambled, coded information bit stream has been created, one of 64 available Walsh codes 318 is used to generate a high chip rate (i.e., wide bandwidth) stream 320. According to a preferred embodiment, a "short code" 322 is then applied to the bit stream to help achieve isolation between base sites. At this point, the I and Q channel data streams are said to be encoded with the aggregate PN sequence 324, as determined by the long code, Walsh code and short code.

Figure 4:
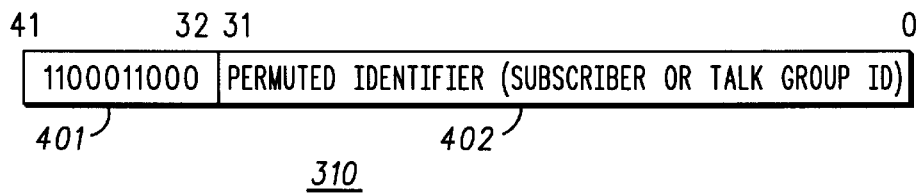
FIG. 4 shows a more detailed view of the long code mask shown in FIG. 3.

FIG. 4 shows a more detailed view of the long code mask 310 shown in FIG. 3. The mask has two distinct fields—a first field 401 acts as a tail appended to permuted identifier field 402, which tail is specified in the IS-95 specification.

As earlier mentioned, the long code is completed using a permutation of the subscriber ID (i.e., the subscriber unit's ESN as described in TIA/EIA/IS-95-A section 6.1.3.1.8) in the permuted Identifier field 402. However, for a group call (e.g., dispatch call to a plurality of talkgroup members), and according to the present invention, the long code field 402 is generated using the talkgroup ID for the target talkgroup. In this manner, the present invention allows the base station to transmit IS-95 compliant forward transmissions to each member of a talkgroup during a group call.

Figure 5:
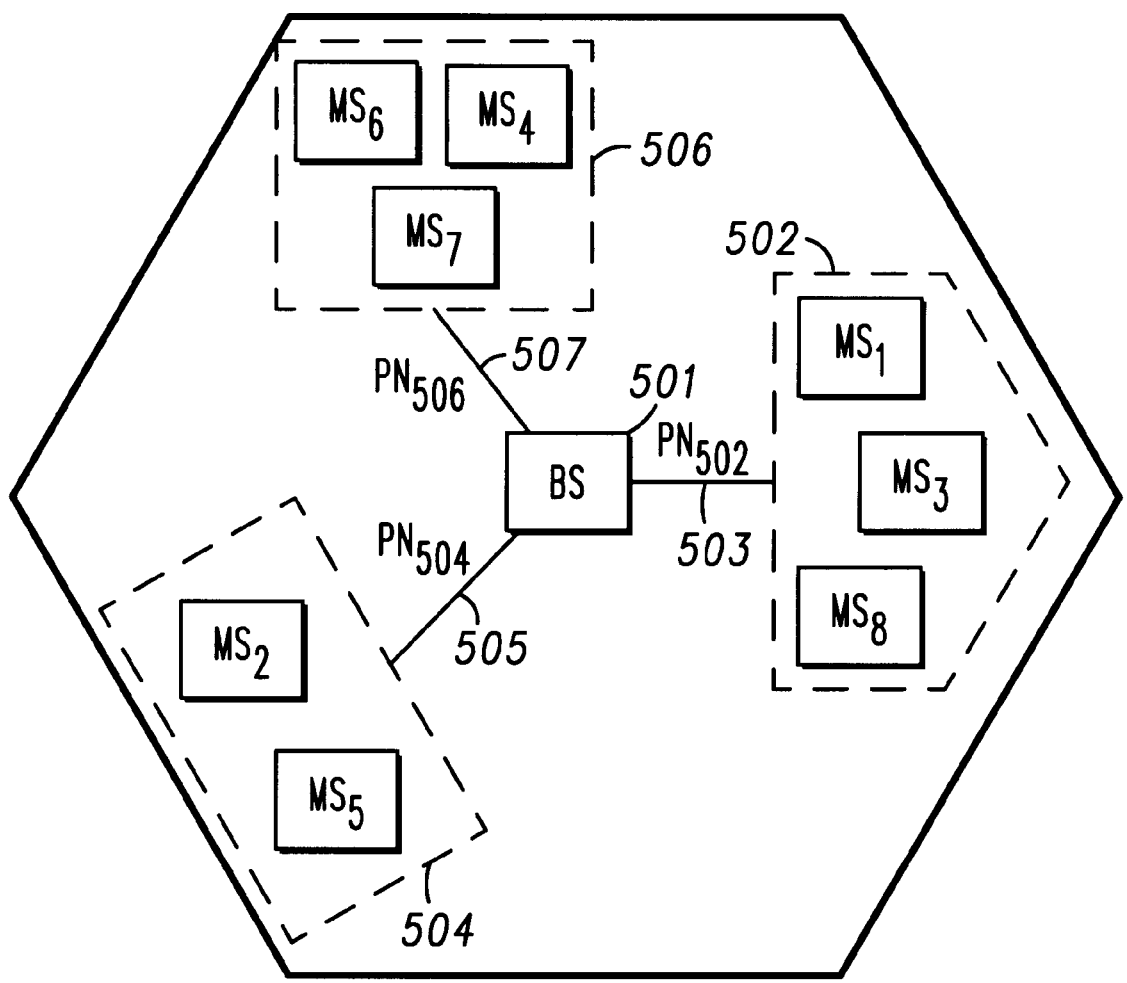
FIG. 5 shows a graphical representation of a CDMA radio communication system that is capable of group call activity, in accordance with the present invention.

FIG. 5 shows a direct sequence spread spectrum (DSSS) digital communication system that includes a base station 501, a plurality of communication units that are shown as being members of a talkgroup 502, 504, 506, respectively. That is, MS1, MS3 and MS8 belong to talkgroup 502, MS2 and MS5 belong to talkgroup 504, and MS4, MS6 and MS7 belong to talkgroup 506. According to a preferred embodiment of the invention, communications between the base station 501 and one of the talkgroups 502, 504, 506 requires a unique scrambling code (PN) to permit each of the members of that talkgroup to correctly decode the transmitted information. By way of example, when a group call is targeted for talkgroup 502, the base station 501 uses a group identifier corresponding to talkgroup 502 to permute the appropriate scrambling code for the forward transmissions. As shown, PN502 is used to encode transmissions on the forward link 503. In this manner, MS1, MS3 and MS8 can receive transmissions from the base station 501, while maintaining privacy from the other mobile stations within the coverage area 500. It should be noted that private calls to single mobile stations throughout the coverage area 500 are performed in accordance with the prior art techniques, i.e., using the subscriber ID as the basis for the long code permutation. Further, although the present invention has been described in terms of a single-cell embodiment, the invention is equally applicable to a multi-cell environment, where multiple base stations are used to relay transmissions from a sourcing location to multiple destination locations.

Figure 6:
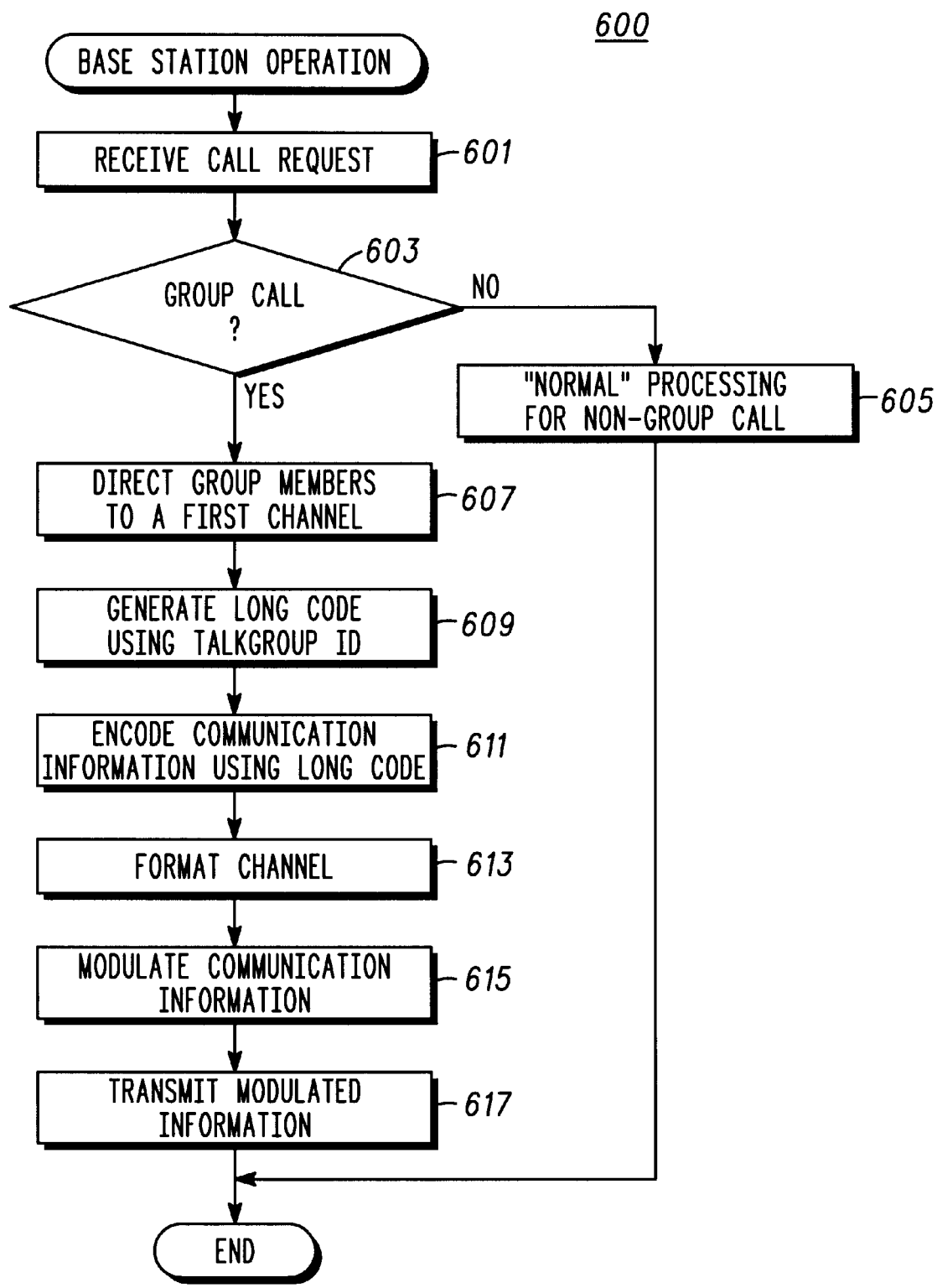
FIG. 6 shows a flow diagram depicting operation of the base station shown in FIG. 5.

FIG. 6 shows a flow diagram 600 depicting operation of the base station 501 shown in FIG. 5. Upon receipt (601) of a call request, the base station makes a determination (603) as to whether or not the requested call type is a group call. If not, the base station undergoes "normal" processing (605) for the non-group call, as is well known. If a group call is requested, the corresponding group members are directed (607) to a first channel, where the forward transmissions are to be received. As part of this call set-up procedure, the base station sends the identifier for the target talkgroup, so that members of that talkgroup are able to receive the call. As shown in FIG. 3, a forward transmission channel would employ one of 64 unique Walsh code spreading sequences, and a base station-specific short code, to spread the forward transmission with a PN sequence. Hence, the base station would inform the subscriber units in the talkgroup of the unique Walsh code and short code employed, in order to direct them to the first channel, and allow them to receive the PN encoded information.

Referring again to FIG. 6, the base station thereafter generates (609) a long code using the talkgroup identifier corresponding to the group call request. The communication information is then encoded (611) using the long code, and the channel is formatted (613) for transmission, such formatting including the general steps of Walsh code spreading and short code scrambling, which, along with the long code encoding, provide the spreading of the information by the PN sequence, as shown in FIG. 3. The communication information is then modulated (615) and transmitted (617) to the members of the talkgroup. In the foregoing manner, a CDMA system is able to efficiently provide group call services to a plurality of talkgroup members, and still maintain privacy standards commonly available in private calls.

Figure 7:
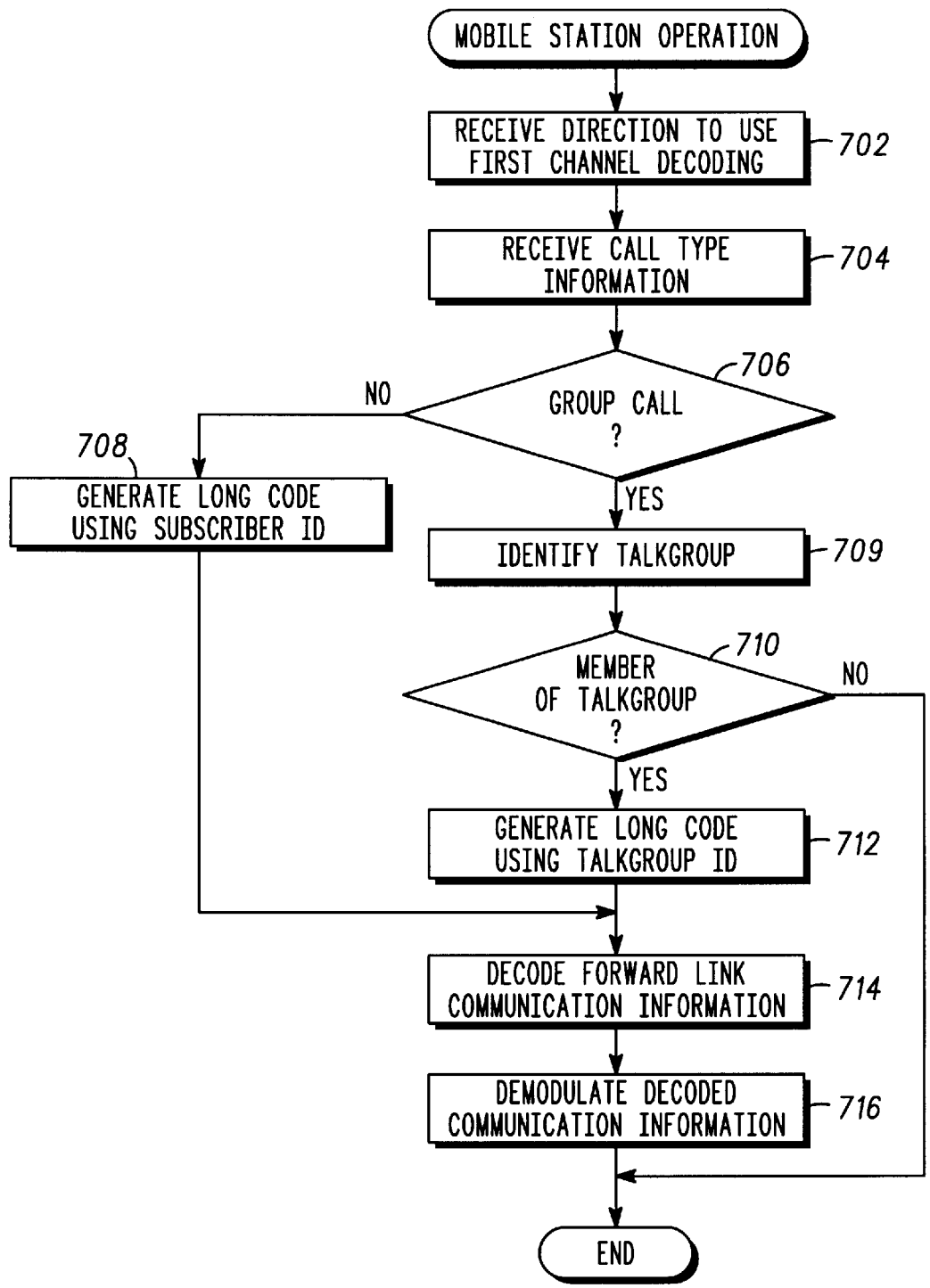
FIG. 7 shows a flow diagram depicting operation of a mobile station, in accordance with the present invention.

FIG. 7 shows a flow diagram depicting operation of a mobile station, in accordance with the present invention. The mobile station receives (702) a direction from the base station to use first channel decoding (i.e., subscriber is provided with the proper Walsh code and short code for the forward link transmission). The mobile station also receives (704) information from the base station as to the call type to determine (706) whether or not the call type is a group call. If the call type is not a group call, the long code is generated (708) using the subscriber ID for that mobile station, and call processing goes on as later described. If a group call is detected, the talkgroup is identified (709). As mentioned earlier, the base station sends the talkgroup identifier, i.e., the MS receives the talkgroup ID as part of the call set-up. After identifying the target talkgroup, a determination (710) is made as to whether or not the mobile station is a member of the identified talkgroup. If the mobile station is not a member of the talkgroup, the routine is exited.

If the mobile station is found to be a member of the identified talkgroup the talkgroup (e.g., via a simple memory retrieval at the mobile station, as is known), the long code is then generated (712) using the relevant talkgroup identifier. The mobile station then decodes (714) the forward link communication information and demodulates (716) the decoded communication information. In this manner, the CDMA mobile station is allowed to participate in a group call, while maintaining privacy from members outside of its own talkgroup.

The use of a group call identifier to provide long code scrambling on the forward link of a spread spectrum communication system, as described above, provides many advantages over the prior art. It allows a plurality of mobile units, belonging to an identified talkgroup, to monitor forward transmissions directed to them utilizing just a single spread spectrum channel, thus providing group call capabilities in an efficient manner. It also prevents other mobile units on the same system from monitoring the forward transmissions, thus providing communication security as expected on such systems. Finally, it does so in a manner compliant with the existing IS-95 standard, thus enabling the easy deployment of group call services on legacy systems.

We claim:

1. In a base station for use in a digital communications system that provides communication services to a plurality of communication units, a method of sending communication information between the base station and at least two of the plurality of communication units, the method comprising the steps of:

identifying the at least two of the plurality of communication units to produce a group identifier that corresponds to the at least two of the plurality of communication units identified; and generating a scrambling code based at least in part on the group identifier.

2. The method of claim 1, further comprising the step of encoding the communication information using the scrambling code to produce encoded information.

3. The method of claim 1, further comprising the step of sending, to the at least two communication units, the group identifier.

4. The method of claim 1, further comprising the step of transmitting the encoded information to the at least two communication units.

5. In a communication unit for use in a digital communications system that includes a base station for providing communication services to a plurality of such communication units, a method of receiving communication information from the base station comprising the steps of:

identifying a call type;

when the call type identifies a group call to a predetermined group, determining whether the communication unit is a member of the predetermined group; and when the communication unit is determined to be a member of the predetermined group, generating a scrambling code based at least in part on a group identifier that corresponds to the predetermined group.

6. The method of claim 5, wherein the step of identifying comprises the step of receiving call type information from the base station.

7. The method of claim 5, wherein the step of determining comprises the step of retrieving the group identifier from a memory location in the communication unit.

8. The method of claim 5, wherein the step of determining comprises the step of receiving the group identifier from the base station.

9. The method of claim 5, further comprising the step of decoding the communication information using the scrambling code.

10. In a communication unit for use in code division multiple access (CDMA) communications system that includes a base station for providing communication services to a plurality of communication units, a method of participating in a group call comprising the steps of:

identifying a group identifier for the group call that corresponds to the at least two of the plurality of communication units identified; and generating a long code based at least in part on the group identifier.

11. The method of claim 10, further comprising the step of using the long code to decode information during the group call to produce decoded information.

12. The method of claim 11, further comprising the step of demodulating the decoded information during the group call.

13. The method of claim 10, wherein the group call is a dispatch call and the step of identifying comprises the step of identifying a talkgroup ID for the dispatch call.

* * * * *